BINARY TRIGGER HAVING TWO PHASE OUTPUT
UTILIZING AND-INVERT LOGIC STAGES
Filed Oct. 6, 1959

INVENTOR
GERALD A. MALEY

BY [signature]

ATTORNEY

United States Patent Office 3,040,198
Patented June 19, 1962

3,040,198

BINARY TRIGGER HAVING TWO PHASE OUTPUT UTILIZING AND-INVERT LOGIC STAGES

Gerald A. Maley, Poughkeepsie, N.Y., assignor to International Business Machines Corporation, New York, N.Y., a corporation of New York Filed Oct. 6, 1959, Ser. No. 844,757
5 Claims. (Cl. 307—88.5)

This invention relates to logical circuits and more particularly to a circuit for producing a single output pulse in response to every second pulse applied at its input.

With the increasing use of digital computers in scientific and industrial applications, mass production methods have been explored to enable production of large computers at a cost acceptable to a wider range of potential users. Reliability and ease of maintenance must also be enhanced. The use of solid state components and printed circuitry has enabled great strides in this direction, however no fully acceptable technique has heretofore been devised and each individual computer is to a large extent, a custom engineered machine.

One of the common techniques in use on present day computers is to formulate entire machine systems on small printed circuit cards. These cards are mounted on frames having receptacles designed to accept the card terminals and interconnection of the individual cards is effected through "back panel wiring." Each of the cards contains a printed circuit or circuits including solid state elements such as transistors, whereby each card performs a given function or functions in the machine organization. The usual digital computer, however, requires a great many different types of individual circuits and consequently, a large number of different printed cards are required. This obviously increases the burden of the manufacturing facility as well as that of the service organization, with a resultant increase in cost and inconvenience to the consumer.

It has been found that almost entire digital computer machines may be fabricated out of different combinations of a single logical circuit performing both the AND and INVERT functions. This logical function is often referred to as the Scheffer or stroke function. Since only one type of circuit is required to fabricate substantially the entire machine, true mass production can be utilized. For example, a printed circuit card can be automatically produced containing a number, e.g., three, of such circuits. All of the printed circuit manufacturing effort can then be devoted to production of this one type of card and the machine can be constructed merely by proper "back panel wiring."

The present invention is directed to a novel binary trigger composed principally of a number of AND-INVERT logical blocks. Feedback connections as well as feed forward connections are used whereby operation of the individual blocks is dependent upon the conditions of both the preceding and succeeding blocks. Hence, in considering the operation of the circuit, it is necessary to take into account the order or sequence of operation of the individual logical blocks as well as the presence or absence of input signals. The circuit may thus be described as a sequential circuit or as utilizing sequential logic techniques. The resultant circuit herein disclosed provides a novel binary trigger of great reliability, simplicity and ease of manufacture which in a computer may perform storage, counting and timing functions.

Accordingly, it is the primary object of this invention to provide an improved binary trigger.

Another object of this invention is to provide a binary trigger comprised of a number of identical circuits and utilizing sequential logic techniques.

It is a further object of this invention to provide a binary trigger circuit fabricated principally of a number of similar circuits which provide a pair of output pulses; one of which begins and ends at the leading edges of successive input pulses, and the other of which begins and ends on the trailing edge of successive input pulses.

A still further object of this invention is to provide a binary trigger composed of a number of AND-INVERT logical blocks connected in sequential manner whereby a pair of non-complementary binary outputs may be produced rapidly and at a minimum of cost.

Briefly, the binary trigger of this invention comprises a plurality of AND-INVERT blocks connected in a sequential circuit. In one embodiment, the input signal is applied simultaneously to a pair of such blocks, as well as through an INVERT block to the input of a third AND-INVERT block. The output of each of said first pair of logical blocks is applied as the input to the respective ones of a pair of output AND-INVERT blocks. The output of the third AND-INVERT block is divided between the input of each of the two output blocks. Three separate feedback paths are provided to effect desired operation of the circuit. In a second embodiment, one of the pair of input AND-INVERT blocks is replaced by a pair of diodes connected back to back. This enables greater speed of operation of the circuit but at a cost of replacing a pre-packaged component with non-standard elements. In both embodiments, the time delays necessitated by the use of sequential logic techniques are provided by the switching delays of the AND-INVERTER blocks used.

The foregoing and other objects, features, and advantages of the invention will be apparent from the following more particular description of preferred embodiments of the invention, as illustrated in the accompanying drawings.

Figure 1:
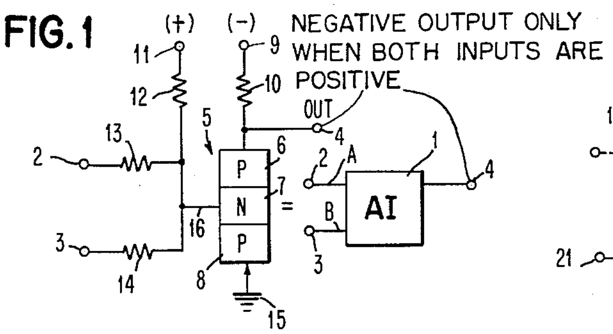
FIGURE 1 illustrates a preferred embodiment of the circuitry used in the AND-INVERT logical block of the invention.

Referring now to FIGURE 1 of the drawings, there is illustrated a simple circuit utilizing a transistor which has been found to be particularly desirable for use as the AND-INVERT block 1 of the invention. As shown, the circuit comprises a transistor 5, illustrated as a PNP transistor of the junction type, having a collector 6, a base 7, and an emitter 8. Negative potential source 9 is connected through resistor 10 to supply bias potentials to the collector 6. Output terminal 4 is connected directly to the collector 6. Emitter 8 is tied directly to reference potential or ground 15. Connected to the base 7 of the transistor via conductor 16 and resistor 12 is a positive potential source 11 of sufficient magnitude to bias the transistor off. Input terminals 2 and 3 are connected through resistors 13 and 14 respectively to lead 16 and thence to the base 7.

As is readily apparent, in the nonconducting or off state of the transistor, the output terminal 4 is at the potential of negative source 9. When the transistor is rendered conductive by application of a suitable signal to its base 7, the output potential rises substantially to ground. For convenience in the ensuing explanation, the output of the transistor in the off condition will be termed the negative level while the output during its conducting time will be termed the positive level. Positive potential source 11 connected to base 7 normally maintains the transistor 5 in its off or nonconductive condition, with the result that its output terminal 4 is at a negative level. The resistors 13 and 14 and resistor 12 are so proportioned that a negative level signal applied at either or both of the terminals 2 and 3 will drive the base sufficiently negative with respect to the emitter 8 that the transistor 5 will go into conduction. It will be understood that in the circuitry in which this building block is used, the inputs 2 and 3 would be the output of other similar logical blocks. Therefore, the negative level at the input terminal would be that of the voltage source 9 and the positive level applied thereto will be substantially ground potential. When one or more negative signal levels are applied at the input terminals of the block 1, the transistor is conducting, thereby providing a positive signal level in accordance with the convention set up above. Only if both input signals are at the positive level will the transistor be nonconducting and a negative level be available at the output terminal 4. The logical block therefore, performs two separate functions; an AND function performed by the resistors 12, 13, and 14 which provides a positive level on line 16 sufficient to hold the transistor nonconducting only when both input signals are at a positive level, and an INVERT function performed by the transistor 5. It will be realized of course that the AND-INVERT function can be realized with other types of transistors as well as other circuit elements which provide the inversion function, and the circuit illustrated is intended merely as an example of such structure. The two inputs to the block 1 are indicated as A and B inputs respectively.

Figure 2:
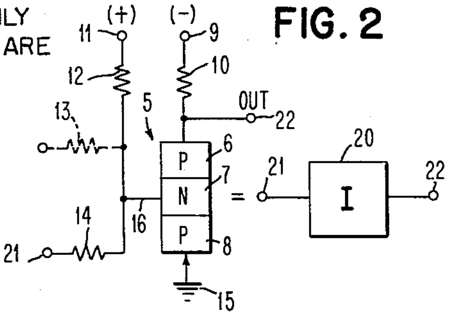
FIGURE 2 illustrates a preferred embodiment of the circuitry used for the INVERT block of the invention.

FIGURE 2 illustrates a modification of the AND-INVERT circuit of FIGURE 1, adapted to be used as an INVERT block only. Like elements of FIGURE 2 have the same numerals as their counterparts of FIGURE 1. As can be seen from the circuit illustrated, the INVERT block is merely the AND-INVERT circuit with but a single input. This is a simple inverter circuit whose output varies between a negative level equal to the potential 9 and a positive level substantially at ground potential in response to positive and negative signal levels respectively at its base. As indicated by the resistor 13 shown in dotted lines, the AND-INVERT block may be used as the INVERT block merely by leaving the terminal of resistor 13 unconnected. In actual practice, the INVERT block is produced in this manner. This permits cards having just one type of printed circuit thereon to be used to perform all the functions of the circuit.

Figure 3:
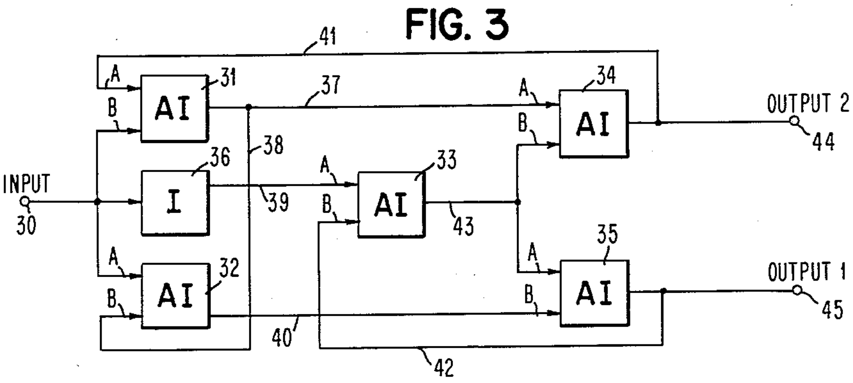
FIGURE 3 is a schematic representation of the circuit of one embodiment of the binary trigger of this invention using the building blocks illustrated in FIGURES 1 and 2.

Referring now to FIGURE 3 of the drawings, a binary trigger according to one embodiment of the invention is shown comprised of five AND-INVERT blocks 31 through 35 inclusive, and a single INVERT block 36. Each of the AND-INVERT blocks is shown having both an A input and a B input as is shown in FIGURE 1. Input terminal 30 is connected directly to the B input of block 31, the A input of block 32, and the single input of the INVERT block 36. The output of block 31 is connected via conductor 37 to the A input of block 34. Conductor 41 couples the output of block 32 to the B input of block 35. The output of block 36 is connected over lead 39 to the A input of block 33, whose output is coupled via conductor 43 to the B input of block 34 and the A input of block 35. Three feedback connections are used in this circuit; conductor 41 couples the output of block 34 to the A input of block 31, conductor 42 couples the output of block 35 to the B input of block 33, and conductor 38 connects the output of block 31 to the B input of block 32. The outputs of the circuit are brought from the outputs of blocks 34 and 35 to terminals 44 and 45 respectively.

In describing the operation of this circuit, it must be appreciated, as discussed hereinabove, that a small but finite time is required to switch the AND-INVERT blocks from one condition to another. In the preferred type of AND-INVERT block used, i.e., utilizing a transistor, this switching time is the turn-on and/or the turn-off time of the transistor used. Sequential logic technique requires that some time delay be introduced into the circuitry, and as will become apparent, the switching time of the transistors provide the necessary delays. These delays will be termed switching delays in the description to follow. It will also be understood that the statement that a block is conducting or nonconducting indicates the condition of its transistor.

At the instant the bias voltages are applied, none of the transistors is yet conducting and accordingly, the outputs of blocks 34 and 35 (and actually all the blocks) are at negative levels. Also, it may be assumed that no input signal is present at the moment, and the input terminal 30 will be at its negative level. The negative level at the output of block 34 is applied to the A input of block 31 and the negative level at the output of block 35 is applied to the B input of block 33. The negative level of the input signal is applied to the B input of block 31 and to the A input of block 32. Therefore, blocks 31, 32, and 33 have their transistors biased to conduction and at the end of one transistor switching delay, these blocks will be conductive and their outputs will be at positive levels. The tendency of the transistors of blocks 34 and 35 to switch as a result of initially having negative inputs applied thereto, is overcome by the positive levels now being applied from blocks 31, 32, 33, and therefore, blocks 34 and 35 remain nonconductive. During this same switching delay, INVERT block 36 has been rendered conductive and a positive level appears at its output, which is applied as the A input to block 33. However, block 33 has its B input at a negative level and is thereby maintained conductive. The circuit is now at its quiescent condition corresponding to time $t_1$ of FIGURE 4.

A positive pulse is now applied at the input terminal 30. Block 31 is unaffected initially since its A input is at a negative level. INVERT block 36 switches to provide a negative output, and block 32, which already had its B input at a positive level, is now biased off to provide a negative output. The above is all that takes place during the first switching delay subsequent to application of the input pulse. The now negative output level of block 32 is applied to the B input of block 35, tending to turn it on. The A input to block 33 goes negative, and both inputs A and B to block 34 remain positive. Thus, during the second switching delay period, block 35 switches to provide a positive output. This output is fed back to the input B of block 33 over conductor 42, however, as noted above, the A input to block 33 is now negative (from the output of inverter 36) thereby maintaining its transistor conductive and its output at a positive level. This condition of the circuit is shown at time $t_2$ in FIGURE 4. The circuit will remain in this state until a change occurs at the input. It will be noted that the output condition of the circuit has changed within a period equal to twice the switching delay of a single transistor block.

When the input signal goes negative, the output of the INVERT block 36 starts to go from negative to positive, input A to block 32 goes negative and the output of block 32 thereby begins to switch towards the positive level. The B input to block 31 also goes negative, but since its A input was already negative, no change occurs at its output. Thus, after one switching delay, block 31 has a positive output, block 32 has a positive output, and the inverter output is also positive. No change has yet occurred in blocks 33, 34 and 35.

The following sequence of operation occurs during the second switching delay period. Since the output of INVERT block 36 is now positive, input A of block 33 is positive. Input B of block 33 is already positive from the output of block 35, so block 33 starts to go nonconductive and its output starts to go negative. Input B to block 35 is positive from the output of block 32 but the now negative going output of block 33, applied as the A input to block 35, prevents block 35 from switching and its output remains at positive level. During the second switching delay period, nothing has happened at block 34 since no change has occurred at the output of block 33 and both the A and B inputs of block 34 are positive, providing a negative level output.

At the termination of the second switching delay period, block 33 has switching to provide a negative output. This negative level is applied as the B input to block 34 which now begins to switch to its conductive state. Its output therefore starts to go positive, and at the end of the third switching delay period, both outputs 1 and 2 are at their positive levels. The positive level at the output of block 34 is fed back over conductor 41 to the A input of block 31, however, since the input signal is still negative, the B input of block 31 is negative, maintaining the block conductive and its output at a positive level. The circuit will, therefore, remain in this condition (shown at time $t_3$ of FIGURE 4) until another change occurs at the input terminal 30. This change in output condition has required three switching delay periods for completion.

When the input signal again goes positive, the following sequence of events takes place. During the first switching delay period after the change in input signal, the output of INVERT block 36 goes from positive to negative level, the output of block 32 goes from positive to negative since both its A and B inputs are now positive, and the output of blocks 31 goes from positive to negative since both its A and B inputs are now positive. The outputs of blocks 33, 34, and 35 remain as they were since the changes in blocks 31, 32, and 36 have not yet reached them. During the second switching delay period, the output of block 33 goes from negative to positive since its A input is now negative, and the output of block 32 goes from negative to positive since the negative output of block 31 is fed back over lead 38 to the B input of block 32. The output of block 34 remains positive since its A input is negative. Its B input, however, from the output of block 33, is now positive. The A input to block 35 is, therefore, also positive, however, no change in block 35 yet occurs since the change in output of block 32 has not yet reached its B input. In the third switching delay period, the change in output of block 32 is applied as the B input to block 35 thereby making both of its inputs positive to render the block nonconducting. This puts its output at a negative level. This negative level is fed back over conductor 42 to the B input of block 33 whose A input is already at a negative level. The block 33, therefore, remains with its output at a positive level. No other changes occur in the circuit. Accordingly, the circuit has switched to the condition shown at time $t_4$ of FIGURE 4 in a period equal to three switching delays.

During the first switching delay after the input signal again goes negative, the output of inverter 36 goes from negative to positive level, and the output of block 31 goes positive since its B input is now negative. No change occurs in block 32 since its output was already at a positive level and no changes occur in blocks 33, 34 or 35 since the changes in block 31 and inverter 36 have not yet reached their inputs. In the second switching delay period, the now positive output of block 31 is applied as the B input to block 32, however since its A input is negative, no change in the output of block 32 occurs. The A input of block 33 is now positive, however, its B input remains negative maintaining its output at a positive level. Both A and B inputs to block 34 are now positive and the block cuts off, dropping its output to a negative level. No change has occurred to the A or B inputs of block 35, therefore its output remains negative. The feedback from the output of block 34 to the A input of block 31 does not affect the latter since its B input is negative. Therefore, during a period equal to two switching delays, the output conditions of the circuit have changed. This is the condition shown at time $t_5$ in FIGURE 4 and is the same as the time $t_1$. Accordingly, one complete cycle of operation has been completed and subsequent operation will be merely repetitive of that described above. As will be apparent from the waveforms of FIGURE 4 and consideration of the above described operation, the outputs of the circuit are not complementary, but rather are phase displaced 90° from one another. Should a complementary output be desired, it would merely require that an additional INVERT block such as shown in FIGURE 2, be coupled to either of the outputs of block 34 or 35.

Figure 4:
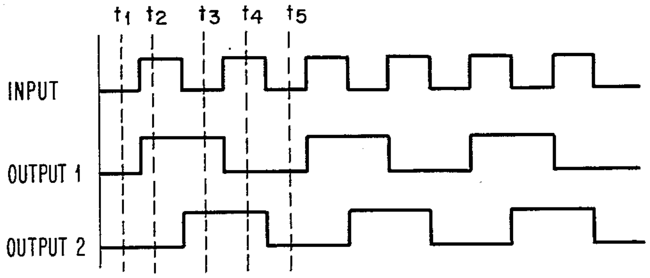
FIGURE 4 illustrates several waveforms useful in explaining the operation of the circuit of FIGURE 3.

The following table, showing the input and output voltage levels of each of the AND-INVERT blocks 31 through 35 at time $t_1$ through $t_5$ of FIGURE 4, will aid in understanding the operation of the circuit of FIGURE 3:

| Time | Block 31 | | | Block 32 | | | Block 33 | | | Block 34 | | | Block 35 | | |
|---|---|---|---|---|---|---|---|---|---|---|---|---|---|---|---|
| | A | B | out | A | B | out | A | B | out | A | B | out | A | B | out |
| $t_1$ | − | − | + | − | + | + | + | − | + | + | + | − | + | + | − |
| $t_2$ | − | + | + | + | + | − | − | + | + | + | + | − | + | − | + |
| $t_3$ | + | − | + | − | + | + | + | + | − | + | − | + | − | + | + |
| $t_4$ | + | + | − | + | − | + | − | − | + | − | + | + | + | + | − |
| $t_5$ | − | − | + | − | + | + | + | − | + | + | + | − | + | + | − |

As can be seen, the above described binary trigger is comprised of six similar switching circuits, five of which have dual inputs and function as AND-INVERT blocks, and the other of which is provided with but a single input to provide the INVERT function. Assuming that three of these circuits may be printed in a single printed circuit card, it would then require but two of such cards to supply the entire circuit. The trigger may then be quickly fabricated merely by interconnection of the proper terminals on the two cards. A further feature of this circuit is its speed of operation. Referring to the above description of operation, it will be seen that a change in output condition occurs at most three switching delay periods after the change in input condition, and in some cases, only two delays are required. With the use of fast switching transistors or other circuit devices, the total operating time of the trigger becomes exceedingly short. As an added advantage, use of the circuits of FIGURES 1 and 2 requires only two voltage levels, other than reference or ground potential, for the entire circuit. This greatly simplifies construction and design of the power supply and enhances the reliability of the circuit.

Figure 5:
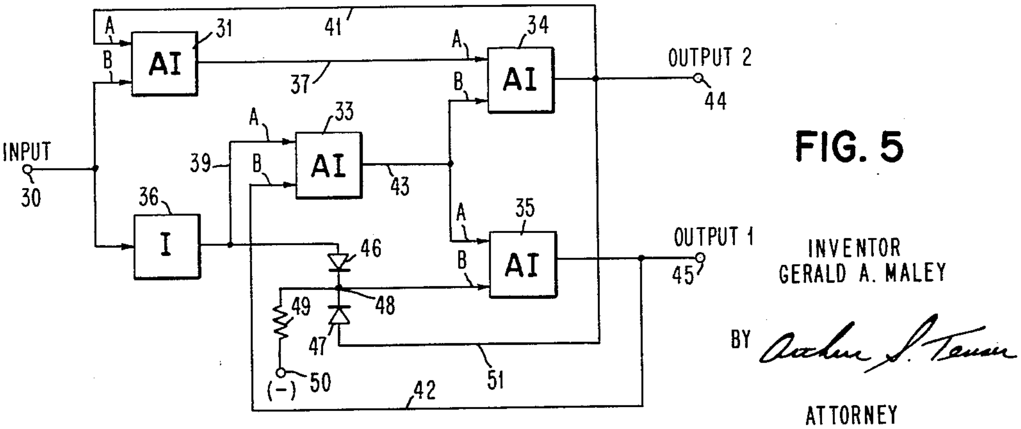
FIGURE 5 is a schematic diagram of another embodiment of the invention utilizing the building blocks illustrated in FIGURES 1 and 2.

In FIGURE 5 is shown another embodiment of the binary trigger of this invention. This circuit is essentially similar to that of FIGURE 3 and like reference numerals are used for corresponding elements of the two circuits. The circuit comprises four AND-INVERT blocks 31, 33, 34 and 35, and one INVERT block 36. The block 32 of FIGURE 3 is not used, however, a circuit comprising diodes 46 and 47 and resistor 49 is substituted therefor. Input terminal 30 is connected to the B input of block 31 and the input of INVERT block 36. The output of block 31 is fed over line 37 to supply the A input to INVERT block 34 whose output is connected to terminal 44 and over line 41 to the A input of block 31. The output of INVERT block 36 is connected over lead 39 to the A input of block 33 whose output is connected via conductor 43 to the B input of block 34 and the A input of block 35. The output of the latter is brought out to terminal 45 and also fed back over conductor 42 to the B input of block 33. The output of block 36 is also connected to the positive or anode terminal diode 46, which may be of any suitable type although the semiconductor variety is preferred. The negative or cathode terminal of diode 46 is connected through junction point 48 to the cathode or negative terminal of a similar diode 47, whose positive terminal is connected over line 51 to the output of block 34. Negative voltage source 50, which may be of the same magnitude as voltage source 9 of FIGURES 1 and 2, is connected through resistor 49 to the junction point 48. The junction is also connected to the B input of block 35.

As will be recognized, the circuit comprising elements 46 through 50 forms a conventional diode OR circuit, whose output at junction 48 will be positive when either or both of the anode terminals of diodes 46 and 47 are positive. Junction point 48 will be negative only when the positive terminals of both of these diodes are negative. In other respects, the circuit of FIGURE 5 is substantially similar to that of FIGURE 3 and the waveforms of FIGURE 4 are applicable to both circuits. The following table of input and output conditions of the circuit of FIGURE 5 will aid in the understanding of its operation:

| Time | Block 31 | | | Block 33 | | | Block 34 | | | Block 35 | | | Junction 48 |
|---|---|---|---|---|---|---|---|---|---|---|---|---|---|
| | A | B | out | A | B | out | A | B | out | A | B | out | |
| $t_1$ | − | − | + | + | − | + | + | + | − | + | + | − | + |
| $t_2$ | − | + | + | − | + | + | + | + | − | + | − | + | − |
| $t_3$ | + | − | + | + | + | − | + | − | + | − | + | + | + |
| $t_4$ | + | + | − | − | + | + | − | + | + | + | + | − | + |
| $t_5$ | − | − | + | + | − | + | + | + | − | + | + | − | + |

Upon application of bias voltages to the circuit, and assuming the input signal is at a negative level, blocks 31 and 36 become conductive providing positive output levels. Junction 48 also goes positive since the anode terminal of diode 46 is now positive. Since the switching speed of the diode circuit 46 through 50 is considerable faster than that of the AND-INVERT or INVERT circuits, the potential at 48 will change in a time substantially smaller than the output levels of any of the other logical blocks. Therefore, this circuit effectively introduces no switching delay into the operation of the trigger.

Prior to receipt of the first input pulse then the circuit is in a stable condition with both outputs 1 and 2 at their negative levels. During the first switching delay after application of a positive pulse, the output of INVERT block 36, and thus the junction 48, goes negative. No other changes take place in the circuit. In the second switching interval, block 35, whose B input is now negative, switches to conduction to produce a positive output. The circuit will be stable in this condition as shown at time $t_2$ of FIGURE 4.

When the input goes negative again, block 36 switches to produce a positive output which makes junction 48 also positive. All this occurs during the first switching interval. All other elements of the circuit remain as is. In the second switching interval, block 33 which now has both A and B inputs at positive levels, switches off to provide a negative output. The tendency of block 35 to switch as a result of its B input going positive, is counteracted by the negative input from block 33 being applied to its A input. Accordingly, this block 35 does not change its output condition. Block 34 switches to provide a positive output during the third switching period since its B input is now negative. No other change occurs in this circuit and it will remain stable in this condition, as shown at time $t_3$ of FIGURE 4.

In the first switching interval after the input signal goes positive again, the output of block 31 goes negative since both of its inputs are now positive. The output of the INVERT block 36 also goes negative, however junction 48 stays positive since the output of block 34 is still positive. No other changes occur. During the second switching delay, block 33 switches to provide a positive output since its A input is now negative. No other changes occur. In the third switching delay interval, block 35 switches to provide a negative output since both of its inputs are now positive. The now negative output of block 35 is fed back to the B input of block 33 but since the A input of block 33 is already negative, no change is effected. The circuit is now in the stable condition shown at time $t_4$ in FIGURE 4.

In the first switching delay period following the next negative excursion of the input signal, blocks 31 and 36 switch to provide positive outputs. No other changes occur. During the second switching delay period, block 34 is switched to provide a negative output since both of its inputs A and B are now positive. Circuit operation is now complete and in the stable condition shown at $t_5$ in FIGURE 4. This condition is identical to that shown at time $t_1$, and accordingly the circuit has completed a full cycle of operation.

The use of diodes 46 and 47 enables a somewhat less expensive circuit to be fabricated, the cost of the diodes being considerably less than that, for example, of a transistor suitable for use in the circuits of FIGURES 1 and 2. Additionally, because of loading effects, the switching delays of the remaining logical blocks are decreased and their use in the circuit provides an overall speed increase in operation of the trigger.

Although the circuits of this invention have been described in a digital computer environment, it is to be realized that these circuits may find application wherever a scale-of-two counting function is required. Moreover, since one or the other of the outputs provides a change in response to every change in the input pulse, this circuit may find use to indicate a change in input condition in a variety of applications. It is to be noted, that the circuits described above are level or D.C. responsive rather than pulse or A.C. responsive.

The particular circuits shown in FIGURES 1 and 2 to perform the AND-INVERT and INVERT functions are not intended to be limiting but are merely exemplary of a class of circuits which may perform these functions. Other types of transistors or other switching means, such as vacuum tubes, may be used to provide the necessary logical functions. It will be recognized that NPN transistors may be used in the above described circuits by suitably reversing biasing potentials. In that case, input and output waveforms will be opposite in polarity to those shown in FIGURE 4.

While the invention has been particularly shown and described with reference to preferred embodiments thereof, it will be understood by those skilled in the art that various changes in form and details may be made therein without departing from the spirit and scope of the invention.

What is claimed is:

1. A binary trigger comprising, a first pair of circuits each having two inputs, an output, and performing the AND-INVERT logical function, an additional one of such circuits, a source of input signals, means including a first switching element coupled between said input signal source and one input of one of said first pair of circuits, means including a second switching element coupled between said input signal source and one input of the other of said pair of circuits, and means coupling the output of said additional circuit to the other inputs of said pair of circuits, said additional circuit being responsive to input signals and the output of said one of said pair of circuits, said one of said pair of circuits being responsive to its two inputs to change its output condition for every positive going change in the input signal, and said other of said pair of circuits being responsive to its two inputs to change its output condition for every negative going change in the input signal, and said other of said pair of circuits being responsive to its two inputs to change its output condition for every negative going change in the input signal.

2. A binary trigger comprising, a first pair of circuits, each having two inputs, and an output and performing and AND-INVERT logical function, a second pair of such circuits, and an additional one of such circuits, a source of input signals connected to one input of each of said first pair of circuits, means connecting the outputs of said first pair of circuits respectively to one input of each of said second pair of circuits, means connecting the output of one of said first pair of circuits to the other input of the other of said first pair of circuits, means including phase inverting means connecting said source of input signals to one input of said additional circuit, and means connecting the outputs of said second pair of circuits respectively to the other inputs of said one of said first pair of circuits and said additional circuit.

3. A binary trigger comprising, first, second, third and fourth circuits, each having two inputs, an output, and performing the AND-INVERT logical function, a fifth circuit having two inputs, an output and performing the OR logical function, a source of input signals, means connecting said source to one input of said first circuit and through phase inverting means to one input of each of said second and fifth circuits, means connecting the output of said first circuit to one input of said third circuit, means connecting the output of said fifth circuit to one input of said fourth circuit, means connecting the output of said second circuit to the other input of each of said third and fourth circuits, means connecting the output of said third circuit to the other inputs of each of said first and fifth circuits and means connecting the output of said fourth circuit to the other input of said fifth circuit.

4. A scale-of-two counter comprising, a plurality of logical switching circuits, a source of input signal, means coupling each of a first group of said circuits to said source to be operative in response to said input signal during a first time interval, a second group of said circuits, each of which performs the AND-INVERT logical function, coupled to the outputs of said first group of circuits and responsive thereto to perform their ascribed logical functions during a second time interval subsequent to said first time interval, and means connecting the outputs of said second group of circuits to respective inputs of said first group of circuits to render operation of said first group of circuits dependent upon both the present condition of the input signal and the previous condition of the outputs of said second group of circuits.

5. The apparatus of claim 4 above wherein at least certain of said first group of said circuits perform the AND-INVERT logical function.

References Cited in the file of this patent

UNITED STATES PATENTS 2,853,238 Johnson ---------------- Sept. 23, 1958

FOREIGN PATENTS 1,182,913 France ---------------- Jan. 19, 1959

OTHER REFERENCES

Article by Frost, "Counting With Relays," Bell System Monograph, B–1688, pages 17 to 21, reprint from AIEE Transactions, 1948 and 1949.